Figure 1:
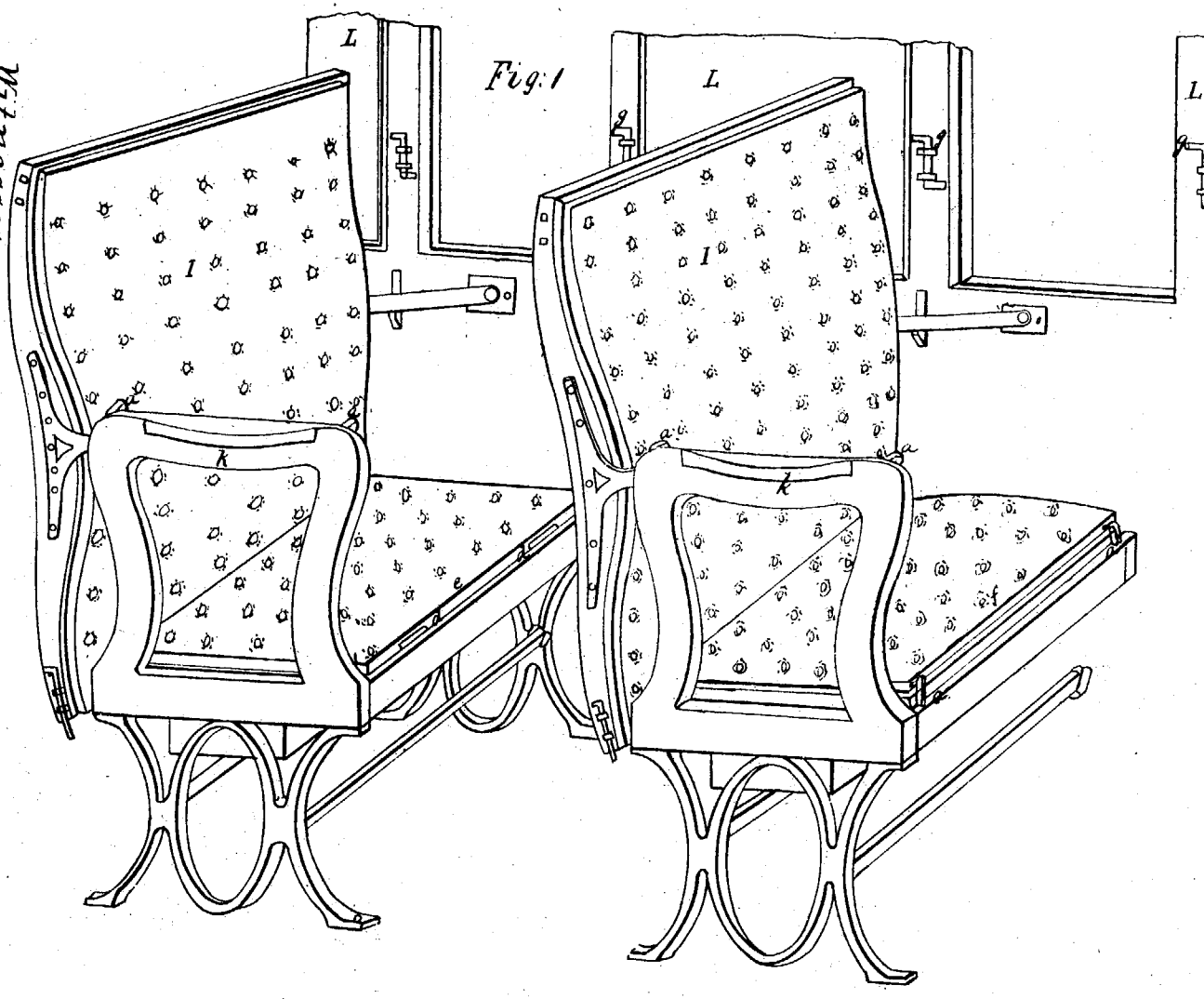

H. B. Myer. Sheet 1, 2 Sheets.

Seat & Couch.

No. 711. Reissued May 3, 1859.

Witnesses.

Edward D. Ashman

Henry O. Ashman

Inventor

Henry B. Myer

H. B. Myer Sheet 2, 2 Sheets
Seat & Couch.
No. 711. Reissued May 3, 1859.
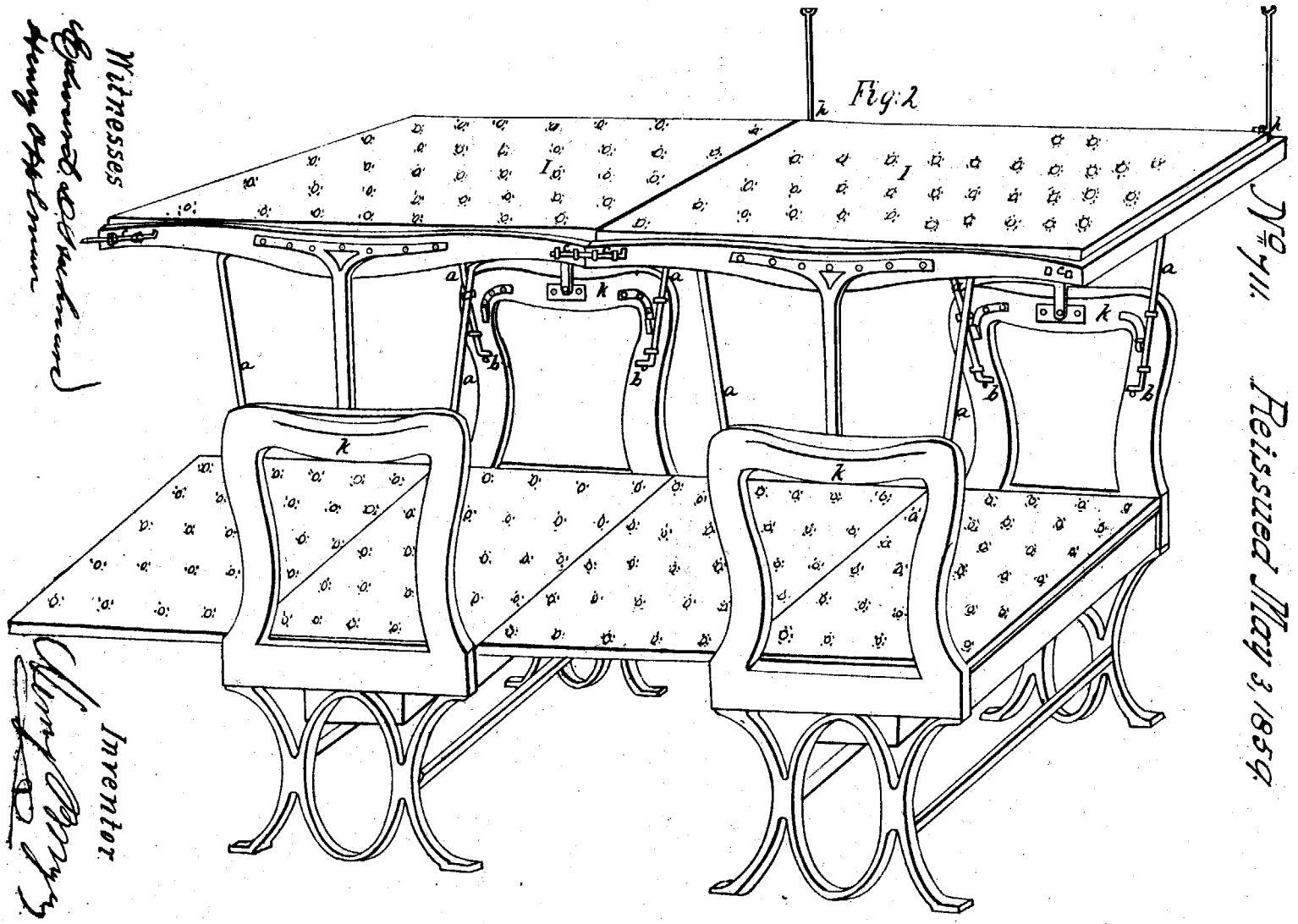
Witnesses
Edmund C. Stedman
Henry O. Holman
Inventor
Henry B. Myer

UNITED STATES PATENT OFFICE.

HENRY B. MYER, OF BUFFALO NEW YORK.

IMPROVEMENT IN THE MODE OF CONVERTING THE BACKS OF CAR-SEATS INTO BEDS OR LOUNGES.

Specification forming part of Letters Patent No. 11,699, dated September 19, 1854; Reissue No. 711, dated May 3, 1859.

*To all whom it may concern:*

Be it known that I, HENRY B. MYER, of Buffalo, in the county of Erie and State of New York, have invented a new and Improved Mode of Converting Railroad-Car Seats—such as are commonly used—into Beds or Lounges, for the purpose of sleeping or resting; and I do hereby declare that the following is a full, clear, and exact description of the same, reference being had to the accompanying drawings, forming a part of this specification, in which—

Figure 1 is a perspective view of car-seats when not converted into upper and lower berths, and Fig. 2 is a perspective view of car-seats when converted into upper and lower berths.

Similar letters of reference in each of the several figures indicate corresponding parts.

The nature of my invention consists, first, in the use of the backs of car-seats for forming upper horizontal beds or lounges, essentially as hereinafter set forth.

It consists, second, in so arranging the backs of contiguous seats that they may meet and remain in the same horizontal plane, essentially as hereinafter set forth.

It consists, third, in the use of a cushion-surface intermediate between the cushioned surfaces of two car-seats, and entirely filling up the space between them so as to form with the same a horizontal bed, berth, or lounge, said intermediate cushion forming an attachment, and appearing as part of a car-seat when not adjusted to aid in forming a berth, bed, or lounge, substantially as set forth.

It consists, fourth, in forming a continuous line of lower horizontal beds, lounges, or berths of a series of car-seats in railroad-cars by uniting the several seats with adjustable cushioned attachments of the seats, whatever be the character or disposition of said attachments, so long as they fill up the entire spaces between the seats and form and appear as parts of the seats, when not adjusted to form said continuous line of lower beds, berths, or lounges.

To enable others skilled in the art to make and use my invention, I will proceed to describe its construction and operation.

The backs of the seats are to be constructed in such proportion to each other and to the distances by which the seats in the car are separated that when they are raised to or fastened in a horizontal position (by means hereinafter described) the backs of any two or more contiguous seats will meet, their upper surfaces forming a continuous and horizontal plane. I turn up the backs of the seats J J, Fig. 1, so constructed to a horizontal position, as at J J, Fig. 2, and retain them there by means of the slides or bars, as *a a a a*, Fig. 2, attached to the frames of the seats by raising them to the proper height and so turning them that their inferior extremities may rest upon the standards, as *b b b b*, Fig. 2, placed in the frames of the seats K K, Fig. 2, for that purpose, or by fastening those sides of the backs, as I I, Fig. 1, adjoining the side of the car L L, Fig. 1, by bars or catches, as *g g g g*, Fig. 1, attached to the sides of the car, or by bolting the backs I I, Fig. 2, together by means of the bolts, as *c c c c*, Fig. 2, or by using cords or wires, as *h h*, Fig. 2, attached to the roof of the car, or by such other mode as may best answer the purposes intended. The cushions S U, cushioned surfaces T V, of the car-seats, or the articles used, therefore are also to be constructed and proportioned to each other and the distances by which the seats in the car are separated that when they are opened or extended and retained in their proper position (by means hereinafter described) upholstered surfaces of the cushion or articles used therefor, of any two or more contiguous seats will meet, forming a continuous and horizontal plane. I open and extend these cushions of the seats, or articles used therefor, which are upholstered on two sides and fitted with hinges *d d d d*, after the manner of the cushion marked *e*, by raising them up and turning out the lower half, which will then extend to the frame of the next seat on which it rests by shoving out two bolts, placed in the frame of the cushions for that purpose, or by opening the cushions or articles used therefor, which are upholstered and fitted as represented in the seat marked *f*, or by such other mode as may be best adapted for the formation of lounges or beds. I form by my plan two ranges of beds or lounges, one placed above the other, extending, if necessary, the whole length of the railroad-car, or the passengers occupying any two seats may, at their option, convert their seats into beds capable of accommodating them in a lying posture without incommoding the other passengers in the car. It is intended that persons occupying these beds or lounges should lie lengthwise of the car.

I wish it to be distinctly understood that I believe myself to be the first one who formed upper horizontal berths, beds, or lounges by means of the backs of car-seats; also, the first one who formed a continuous line of upper beds or lounges by uniting the backs of contiguous seats; and likewise the first one who formed lower berths by filling up the intermediate spaces between the bottoms of each pair of seats by means of cushioned attachments which form and appear as parts of the seats, when not adjusted so as to form, in combination with the cushioned surfaces of the seats, horizontal beds or lounges; also, the first one who formed a continuous line of lower berths with several car-seats and attachments thereof; and that I therefore intend by the following claims and foregoing description to cover, broadly, thus forming upper and lower horizontal berths, beds, or lounges in railroad-cars, not, however, intending by this to include any superior patented or patentable mechanical arrangement for carrying out my invention, but simply to render the users of the same subject to my patent.

What I claim as my invention, and desire to secure by Letters Patent, is—

1. The use of the backs of car-seats for forming upper horizontal beds or lounges, substantially as set forth.

2. So arranging the backs of contiguous seats that they may meet and remain in the same horizontal plane, substantially as and for the purposes set forth.

3. The use of a cushioned surface intermediate between the cushioned surfaces of two car-seats, so as to form with the same a horizontal bed, berth, or lounge, said intermediate cushion forming an attachment to and appearing as part of the car-seat when not adjusted to aid in forming a berth, bed, or lounge, substantially as set forth.

4. Forming a continuous line of lower horizontal beds, berths, or lounges of a series of car-seats in railroad-cars by uniting the several seats so as to fill up the entire space between the seats with adjustable cushioned attachments of the seats, whatever be the character or disposition of said attachments, so long as they form and appear as parts of the seats, when not adjusted to form said continuous line of lower beds, berths, or lounges, substantially as and for the purposes set forth.

HENRY B. MYER.

Witnesses:

BENJ. H. STAIR,

A. C. KENDALL.